Figure 1:
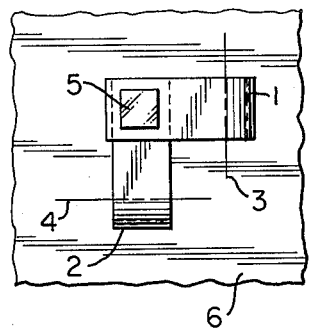

United States

Maccabee

3,998,092

Dec. 21, 1976

[54] SIMPLE SYSTEMS FOR LIGHT BEAM MODULATION BY ACOUSTIC SURFACE WAVES

[76] Inventor: Bruce Sargent Maccabee, 10706 Meadowhill Road, Silver Spring, Md. 20901

[22] Filed: Dec. 23, 1974

[21] Appl. No.: 535,965

[52] U.S. Cl. .................................. 73/71.3; 350/285
[51] Int. Cl.² .......................................... G01H 1/00
[58] Field of Search ............ 73/71.1, 71.3; 350/285

[56] References Cited
UNITED STATES PATENTS 2,143,011  1/1939  De Juhasz .................... 350/285 X
3,909,135  9/1975  Lipkind ......................... 350/285 X

*Primary Examiner*—John K. Corbin
*Assistant Examiner*—F. L. Evans

[57] ABSTRACT

A simple system is described which makes surface vibrations apparent by mechanical deviation of a light beam. The system comprises two or more U springs which are fastened to the vibrating surface and which mechanically amplify the vibrations thus creating large beam deviations from small surface vibrations that occur at mechanical resonance frequencies of the U spring system.

2 Claims, 4 Drawing Figures

U.S. Patent  Dec. 21, 1976  3,998,092

SIMPLE SYSTEMS FOR LIGHT BEAM MODULATION BY ACOUSTIC SURFACE WAVES

This invention relates to light beam deviating devices of a mechanical nature and particularly to those devices which change the direction of a light beam in response to acoustic surface waves. Such waves are produced on vibrating membranes, speaker cones, fluids in a gravitational field, and other vibrating surfaces. The surface waves are displacements of a surface in a direction perpendicular to the surface or to a plane tangent to the surface.

The main object of this invention is to produce a device whereby small surface vibrations can be made to produce large angle deviations of a light beam. Another object of the invention is to be able to adjust the pattern of light beam deviations that are produced at a given surface wave frequency. Still another object of the invention is to be able to select the surface vibration frequencies at which large angle deviations are produced. Another object of this invention is to produce a device which is sensitive to the directions that waves may be travelling on the surface. Yet another object of the invention is to be able to do these things with a simple, mechanical system.

The major novelty of this invention is its use of U springs in a mechanically resonant system, one free end of which is fastened to the vibrating surface and the other free end of which is fastened to a light beam reflector. The use of U springs allows for frequency selection by simple mass loading of the springs. The use of U springs also allows the creation of a biaxially resonant system. In a biaxially resonant system the pattern produced by the light beam deviations at a given surface vibration frequency can be adjusted by adjusting the angle between the axes. The use of U-springs also results in a device which is sensitive to the directions that waves may be travelling along a surface. Of course, more U springs could be used to create a multi-axially resonant system, but its operation would be fundamentally the same as the biaxial system described here.

Figure 2:
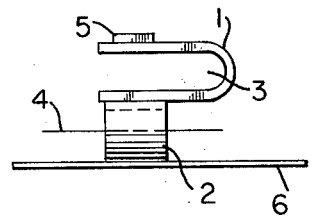

That the above objectives are achieved in the embodiment of the invention will become apparent when the following detailed description is read in conjunction with the attached drawings in which FIG. 1 is a "top" view of one embodiment of the invention FIG. 2 is a "side" view of the same embodiment as FIG. 1

Figure 3:
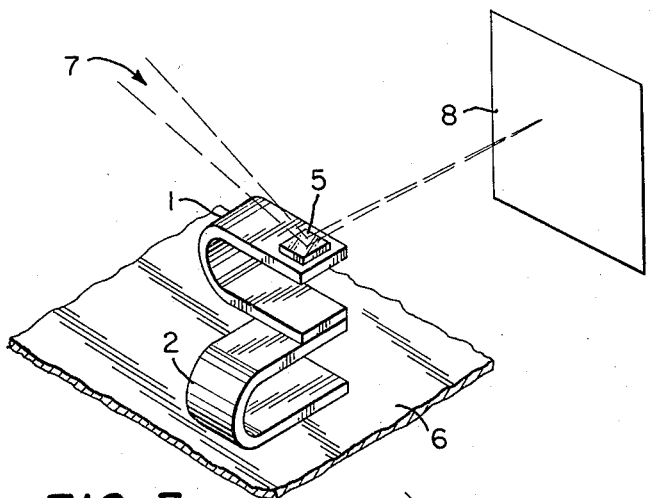
Figure 4:
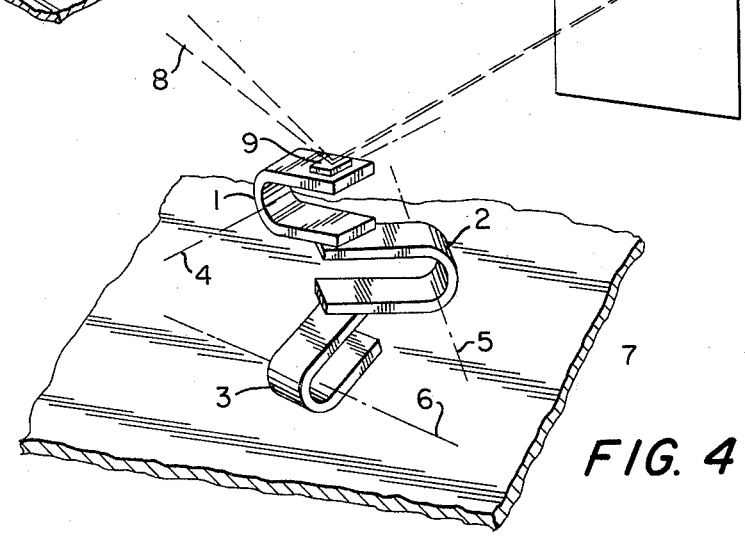

FIG. 3 shows the invention incorporated into a complete light beam modulation system FIG. 4 shows another embodiment of the system A detailed description of the invention will now be given.

FIGS. 1 and 2 are two views of one embodiment of the invention. They illustrate the insertion of a biaxial combination of U-springs between the surface on which surface waves (vibrations) are to be detected and the light beam reflector (a mirror). The bending axes of the U-springs are shown at right angles to one another, but they may be at any angle other than zero degrees, depending upon the types of surface waves one wishes to detect and upon the pattern of light beam deviation one wishes to achieve. Referring to FIG. 1, the elements labelled 1 and 2 are U-shaped springs which are joined together at one end of each U shape. The bending axes of the U-springs are illustrated by 3 and 4. The free end of U-spring 1, the spring farthest from the surface, is fastened to a mirror, 5. The end of U-spring 2 that is not fastened to U-spring 1, i.e., the free end of U-spring 2, is fastened to the vibrating surface, 6. FIG. 2 shows the bending axis, 3, as seen end on and it shows the surface, 6, edge on. The U-springs are again 1 and 2, with 1 having the mirror, 5, attached and 2 being attached to the surface. In this arrangement U-spring 1 is most sensitive to surface waves travelling along the surface in directions exactly or nearly perpendicular to the bending axis 3, while U-spring 2 is most sensitive to surface waves travelling in directions perpendicular to bending axis 4. Since 2 is unrestricted in its motion (except for the mass loading of the spring caused by 1 and 5), the vibration of the surface caused by waves travelling in directions perpendicular or nearly perpendicular to axis 3 are transferred to spring 1 via spring 2. Since any wave travelling on the surface can be decomposed into direction components that lie along one or both of the bending axes, any wave will excite one or both of the U-springs to vibrate. The amplitude of vibration depends upon the resonance frequencies of the U-springs and on the surface wave frequencies. The U-springs can "amplify", by resonant oscillation, the surface wave vibration effects and thus increase the overall sensitivity of the system to small vibrations at certain resonant frequencies.

Vibrations of the U-springs cause the mirror to tilt in response to the vibrations. Any given tilt of the mirror can be decomposed into tilt components about the bending axes of the U-springs, and therefore any surface wave which causes one or both of the U-springs to vibrate will also cause the mirror to tilt about one or both of the bending axes. The mechanical amplification possible at resonant frequencies of the U-spring — mirror system greatly increases the amount of mirror tilt over the amount of tilt that a surface wave would cause if the mirror were simply fastened to the surface.

FIG. 3 is a perspective view of a complete biaxial light beam modulation system. The U-springs, 1 and 2, are fastened, as in FIGS. 1 and 2, to the mirror 5 and to the surface, 6. A focused light beam or laser beam, 7, impinges on the mirror, 5, and is reflected to a viewing screen, 8. FIG. 4 is a perspective view of another embodiment of the invention. It incorporates a triaxial U-spring arrangement. The U-springs are 1,2, and 3. One end of U-spring 2 is fastened to one end of U-spring 1, and the other end of 2 is fastened to U-spring 3. The other end of 1 is fastened to the mirror, 9, and the other end of 3 is fastened to the vibrating surface, 7. The bending axis of 1 is 4, the bending axis of 2 is 5, and the bending axis of 3 is 6. U-spring 1 is maximally sensitive to surface waves travelling in a direction perpendicular to axis 4; 2 is maximally sensitive to surface waves travelling in a direction perpendicular to axis 5; and 3 is maximally sensitive to waves travelling in directions perpendicular to axis 6. A light beam, 8, impinges on the mirror, 9, and then on the viewing screen, 10.

The operation of the acoustic surface wave light beam modulation system is most easily explained in the case of a biaxial U-spring system with the axes at right angles, as in FIGS. 1,2, and 3. From the detailed description given above one can see that surface waves travelling in a direction that is perpendicular to one of the bending axes will maximally excite the U spring with that axis. The major amount of tilt or rotation of the mirror will then be about that axis and no other. The pattern produced by the light beam on the viewing screen will be a straight line or an ellipse. If a wave travels at an angle with respect to both axes (neither angle 90°), both U springs will be excited and the rotations of the reflecting surface will be a complicated function of the resonances and phase lags of the two individual U spring oscillations. If the frequency and direction of the surface waves are such that the oscillations phases of the individual (i.e., "upper and lower") U-springs differ by 90°, the pattern produced by the rotations of the reflecting surface will be circular. If the phases differ by other than 90°, the patterns will be elliptical or linear. At large amplitudes anharmonic tendencies can be utilized to create patterns which are not simple Lissajous figures. For example, square, rectangular, and highly distorted patterns can be produced with a biaxial system fastened to the surface of a loudspeaker cone.

The size of the U springs depends upon the wave frequencies that are to be detected in the following way: the largest dimension should be smaller than one quarter of the length of the shortest surface wavelength (highest frequency) that is to be detected. The U springs can be weighted to produce maximum beam deviation (resonance) at selected frequencies.

It is apparent that there are many varied arrangements of U springs which can be used to create beam deviations that are functions of the surface vibrations. However, as long as at least two such U-springs are fastened together so that the angle between their axes is greater than zero degrees are thus used in a system to detect surface vibrations by light beam deviation, the system so made is contained within the scope of this specification.

What I claim is:

1. A system for the detection of surface vibrations that comprises two U shaped springs, each spring having flat surfaces on either side of the bent portion of the spring, said bent portion having a bending axis and said flat surfaces being parallel to each other and also to the bending axis, a light beam, a mirror, and a viewing screen, which are combined in such a way that the mirror is fastened to the flat surface of one side of the first of the U-springs, the flat surface of the other side of that U-spring is fastened to the flat surface of one side of the second U-spring in such a way that the bending axes of the two joined U-springs are at an angle greater than zero degrees, the other flat side of the second U-spring is fastened to the surface on which the vibrations are to be detected in such a way that the bending axis of the second U-spring can vibrate in response to the surface vibrations and can couple said vibrations to the first U-spring and mirror which can vibrate freely in response to said coupled vibrations, and the light beam impinges on the mirror and is reflected onto the viewing screen.

2. A system as in claim 1 but with more than two U-springs joined together with their respective bending axes at various angles greater than zero degrees to one another as in claim 1 between the mirror and the vibrating surface.

* * * * *